March 10, 1931.  M. A. NIELSEN  1,795,571
CARGO HATCHWAY
Filed Aug. 14, 1930  2 Sheets-Sheet 1
Fig:1.
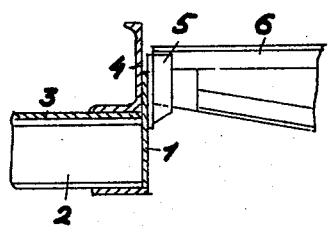
Fig:2
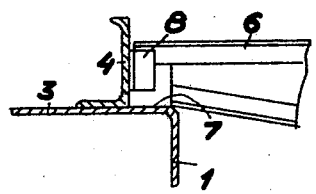
Fig:3.
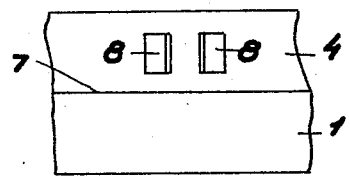
Fig:4.
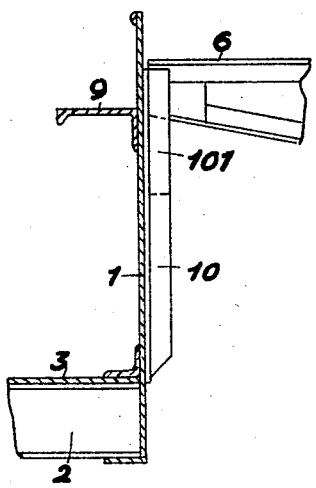
Fig:5.
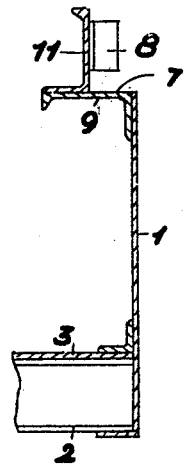
Martin Andreas Nielsen
INVENTOR;
By *Otto Munk*
his Attorney.

March 10, 1931.  M. A. NIELSEN  1,795,571
CARGO HATCHWAY
Filed Aug. 14, 1930  2 Sheets-Sheet 2
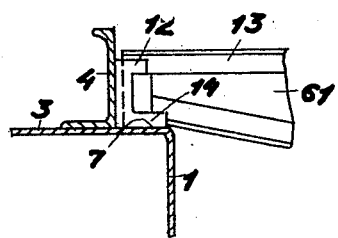
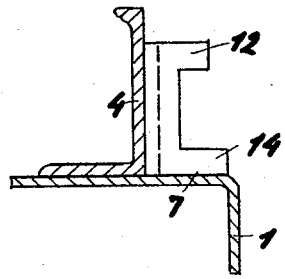
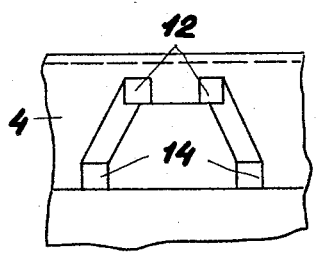
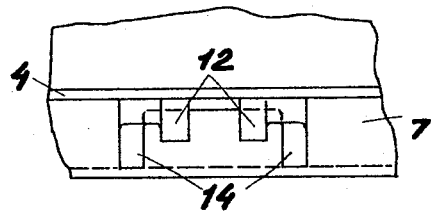
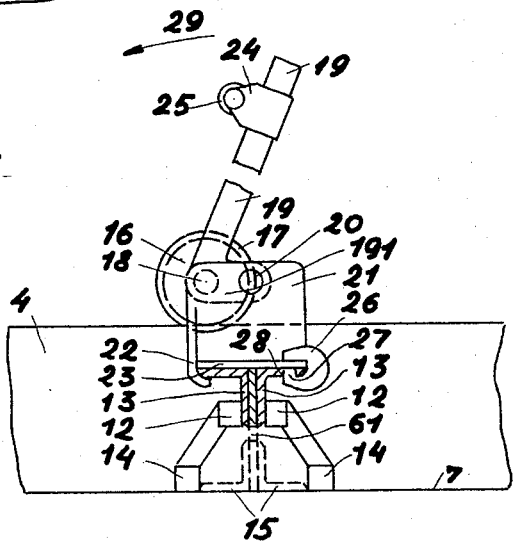
Martin Andreas Nielsen
INVENTOR
By Otto Munk
his Attorney Patented Mar. 10, 1931

1,795,571

UNITED STATES PATENT OFFICE

MARTIN ANDREAS NIELSEN, OF ODENSE, DENMARK

CARGO HATCHWAY

Application filed August 14, 1930, Serial No. 475,324, and in Denmark August 30, 1929.

The invention relates to improvements in cargo hatchways, and particularly a device for supporting the hatch webs therein and for keeping the same in position. Ordinarily the hatch webs are held in position by web carriers consisting as a rule of cast fittings fixed in the hatchway itself. The hatch webs are then of such a length that they cannot rest in the hatchway unless they be inserted into these carriers. The consequence is that when during discharging and loading the hatch webs are to be removed from the hatchway they have to be lifted up therefrom and placed somewhere on the deck, where they generally are in the way during the discharging and loading work.

According to the present invention this drawback is removed by using a platform running along the entire length of the along-ship coamings, on which platform the hatch webs can rest, and along which they can slide in the along-ship direction. Hereby the advantage is attained that the hatch webs not only may remain in position at the points of the hatch where they are, when the hatch covers have been placed into position, but may be gathered together at the ends of the hatchways during discharging and loading, so that these operations may be performed freely, without the hatch webs obstructing the deck.

The invention relates further to special supporting devices for the hatch webs enabling the latter to be held in position when the hatches are closed but allowing the said webs, after having been lifted slightly, to be displaced longitudinally along the above mentioned platform. For this purpose it is of special advantage to use a lifting device forming part of the invention for the hatch webs, which will be further described below.

On the drawing

Fig. 1 shows a vertical section of a hatch coaming of usual construction for the lower decks, Fig. 2 a corresponding section of a hatch coaming according to the invention, Fig. 3 the same viewed from the hatch, Fig. 4 a vertical section of a hatch coaming of usual construction on the upper deck, Fig. 5 a corresponding hatch coaming according to the invention, Fig. 6 a modified construction of hatch coamings for the lower decks, Fig. 7 the same viewed in along-ship direction, without any hatch web inserted, Fig. 8 the same viewed from the centre of the hatchway, Fig. 9 the same in top view, and Fig. 10 a device for lifting and moving hatch webs in the hatch construction shown in Figs. 6 to 9.

Ordinarily the hatchway is bounded, as shown in Fig. 1, by a coaming plate 1 riveted to the ends of the deck beams 2, there being attached to the deck 3 a coaming angle 4, which is nearly in line with the coaming plate 1. To the inner face of the coaming angle and the coaming plate the web carriers 5 are attached, which generally are cast and serve to hold and guide the hatch webs.

According to the invention the hatch angle 4, as shown in Figs. 2 and 3, is set somewhat back on the deck 3, so as to produce a platform or rabbet 7 between the edge of the hatchway and the coaming, on which rabbet the hatch webs 6 can rest directly. The hatch webs are guided and maintained in their proper position by means of guide-angles 8 attached to the coaming angle and not projecting beyond the edge of the hatchway. These guide-angles are thus well protected against injury during discharging and loading. Another advantage is that these angles, which do not have to support the hatch webs and the hatch covers resting thereon, may be of rather light construction, so that they will be considerably cheaper and lighter than the heretofore used hatch-web carriers.

The coaming plate 1 on the upper deck is generally made quite high, as shown in Fig. 4, and such a high coaming plate is generally braced by a horizontal stiffening angle 9. The hatch webs 6 rest here in hatch-web carriers, which usually consist of two angle irons 10 riveted side by side, between which angles a filler 101 is inserted on the top edge of which the hatch webs are resting. According to the invention this construction is modified, as shown in Fig. 5, by attaching to the stiffening angle 9 a coaming angle 11 set back on the stiffening angle in such a manner that the rabbet 7 is formed thereon between the coaming angle 11 and the coaming plate 1. In this construction guide-angles 8 may be used in the same manner as in the construction shown in Figs. 2 and 3.

Figs. 6 to 9 show a modified construction according to which the hatch-web carrier of a cast member fitted with two projecting lugs 12 between which the vertical legs of the upper angle irons 13 on the hatch-webs 61 can be supported, and two longer lugs 14 between which the horizontal legs of the bottom angles 15 of the hatch webs can be placed. By this construction the hatch webs 61 are cut in such a manner that the vertical legs of top angles 13 project into the space between the lugs 12, while the bottom angles 15 are so short that they as well as the central plate 61 of the hatch webs end outside of the lugs 12 but between the longer lugs 14. It will be noted that by this construction the hatch webs rest directly on the rabbet 7 with the bottom angles situated between the lugs 14, while the upper angle irons are supported by the short lugs 12. By this construction it is merely necessary to lift the hatch webs so far that the top angles 13 come free of the lugs 12 at the same time as the bottom angles 15 come free of the lugs 14, whereafter the hatch webs can be moved in the along-ship direction, as the ends of the central plate 61 of the hatch web and the bottom angles 15 can freely pass the short lugs 12. This lifting of the hatch webs is effected by the lifting and moving device shown in Fig. 10.

This apparatus consists essentially of a wheel 16 fitted along its edge with a groove 17 by means of which it can roll on the top of the coaming angle 4. The wheel 16 supports a central pin 18 about which a bell-crank lever 19 is pivoted.

The bell-crank lever 19 has a long arm serving as a hand-spike and a short arm 191 fitted with a pin 20 about which a plate 21 is pivoted. When the wheel 16 engages the top edge of the coaming angle 4 the plate 20 hangs down along the inner face of this angle. The plate 21 supports a hook 22 and is fitted, at bottom, with a flange 23, which extends down to the top of the angles 13 on the hatch webs, when the bell-crank lever 19 is swung upward. The longer arm of the bell-crank lever 19 is fitted with a clip 24 supporting a small roll 25.

When the lifting device from the lefthand side is moved on to the hatch web in the position shown in Fig. 10 then the hook 22 engages the top angle 13 on the hatch web. At the same time the righthand end of the flange 23 will engage from below a loose hook 26, in such a manner that a pin 27 thereon will enter a hole 28 in the hatch-web angle 13. Hereby plate 21 and the hatch web are locked together. When now the bell-crank lever 19 is swung in the direction of the arrow 29 in Fig. 10 the pin 20 will be raised relatively to the pin 18, in such a manner that the hatch web will hereby be raised so far that the angles 13 come free of the lugs 12, and the angles 15 come free of the lugs 14. The dimensions are adjusted in such a manner that the roll 25 will bear against the top edge of the coaming angle 4, when the pin 20 has been swung somewhat beyond the vertical plane through the axis of the pin 18. Hereby the advantage is attained that the weight of the web will press the roll 25 against the coaming angle, in such a manner that the device will be in equilibrium when the hatch web is lifted. The device can now be rolled along the top edge of the coaming angle 4, whereby the hatch web is transported in the longitudinal direction of the ship to the point where it is desired to leave it during the discharging. When the latch web has reached the desired position the bell-crank lever is again swung upward, whereafter the hatch web is lowered, until it rests on the platform 7.

A lifting and moving device of this construction is used at each end of the hatch web. By the use of this apparatus the advantage is attained that the displacement of the hatch webs can be effected by two men, without the booms and winches of the ship being utilized for this purpose.

The lifting device here described may be varied in many manners without thereby transgressing the frames of the invention.

What I claim as new is:

1. Improvements in cargo hatchway consisting in a coaming angle along the longitudinal edges of the hatchway, said coaming angle being set back from the edge of the hatchway, on its supporting surface, said coaming angle being fitted with two projections disposed above two longer projections adapted to engage the end of a hatch web, which is inserted therein, the top edge of which is longer than the bottom edge resting on the rabbet.

2. Improvements in cargo hatchways consisting in a coaming angle along the longitudinal edges of the hatchway, said coaming angle being set back from the edge of the hatchway, on its supporting surface, in such a manner that a rabbet is formed between the coaming angle and the hatchway edge on the said supporting surface, the said rabbet being adapted to support the hatch webs, a wheel adapted to roll on the top edge of the coaming angle, a central pin in said wheel serving as pivot for a bell-crank lever, pivoted to said bell-crank lever a carrier-plate, adapted to be coupled to the hatch web.

3. Arrangement as claimed in claim 2 wherein the bell-crank lever consists of a long arm, serving as hand spike, fixed on said long arm a roll, adapted to roll along the top edge of the hatch angle in the lowered position of the bell-crank arm.

In testimony whereof I affix my signature.

MARTIN ANDREAS NIELSEN.